United States Patent Office 3,385,216
Patented May 28, 1968

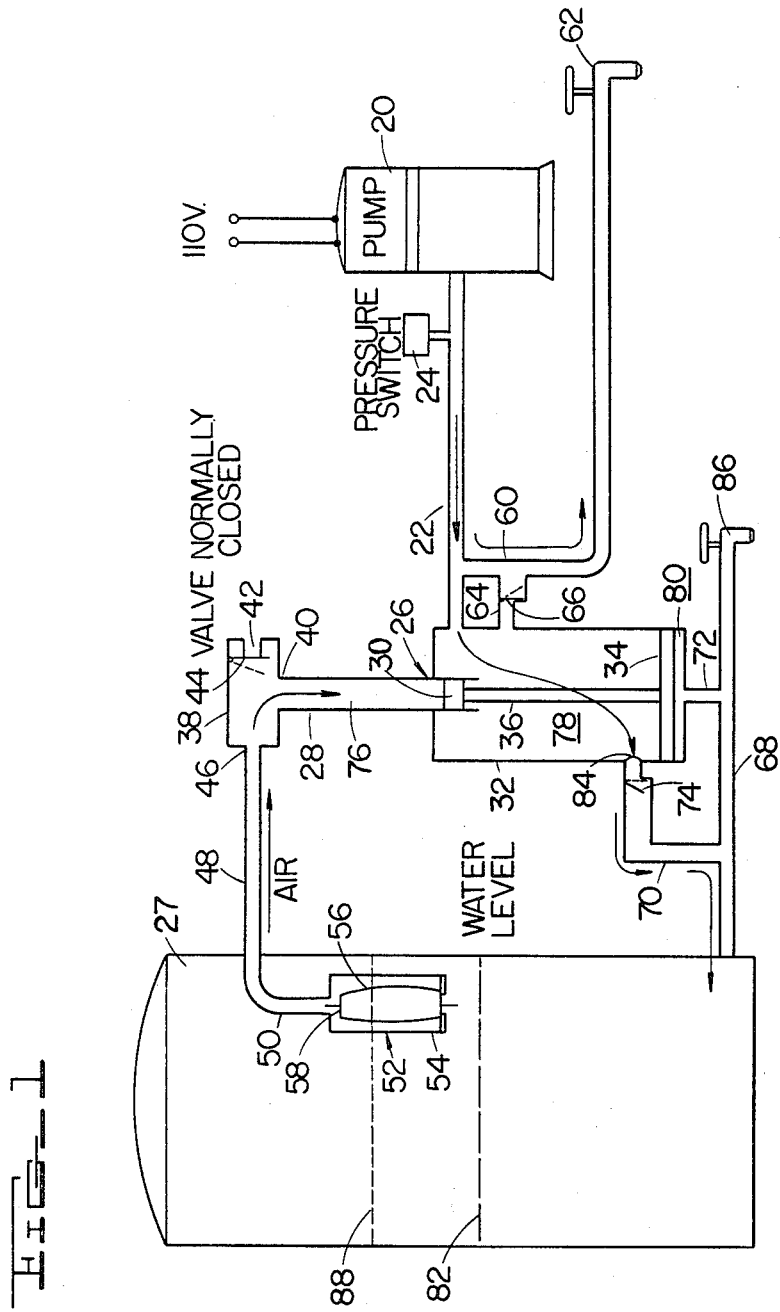

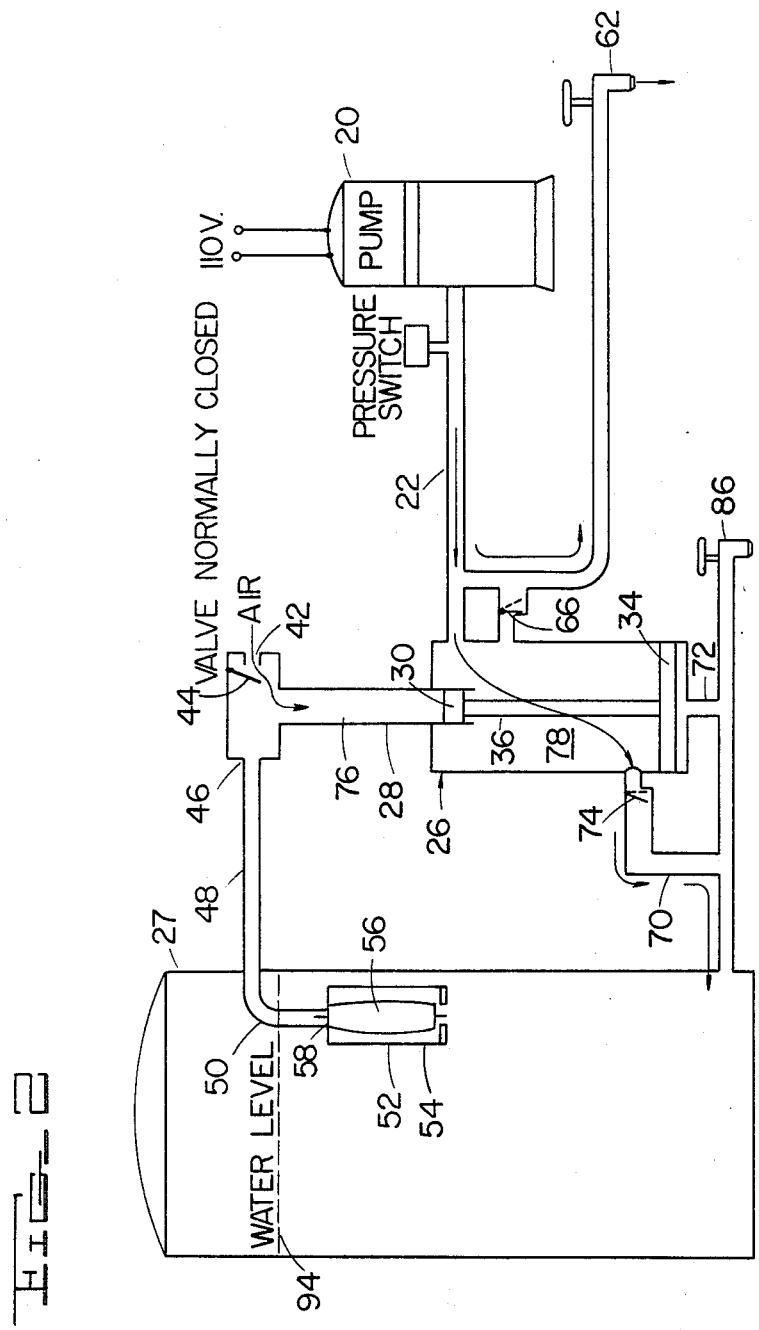

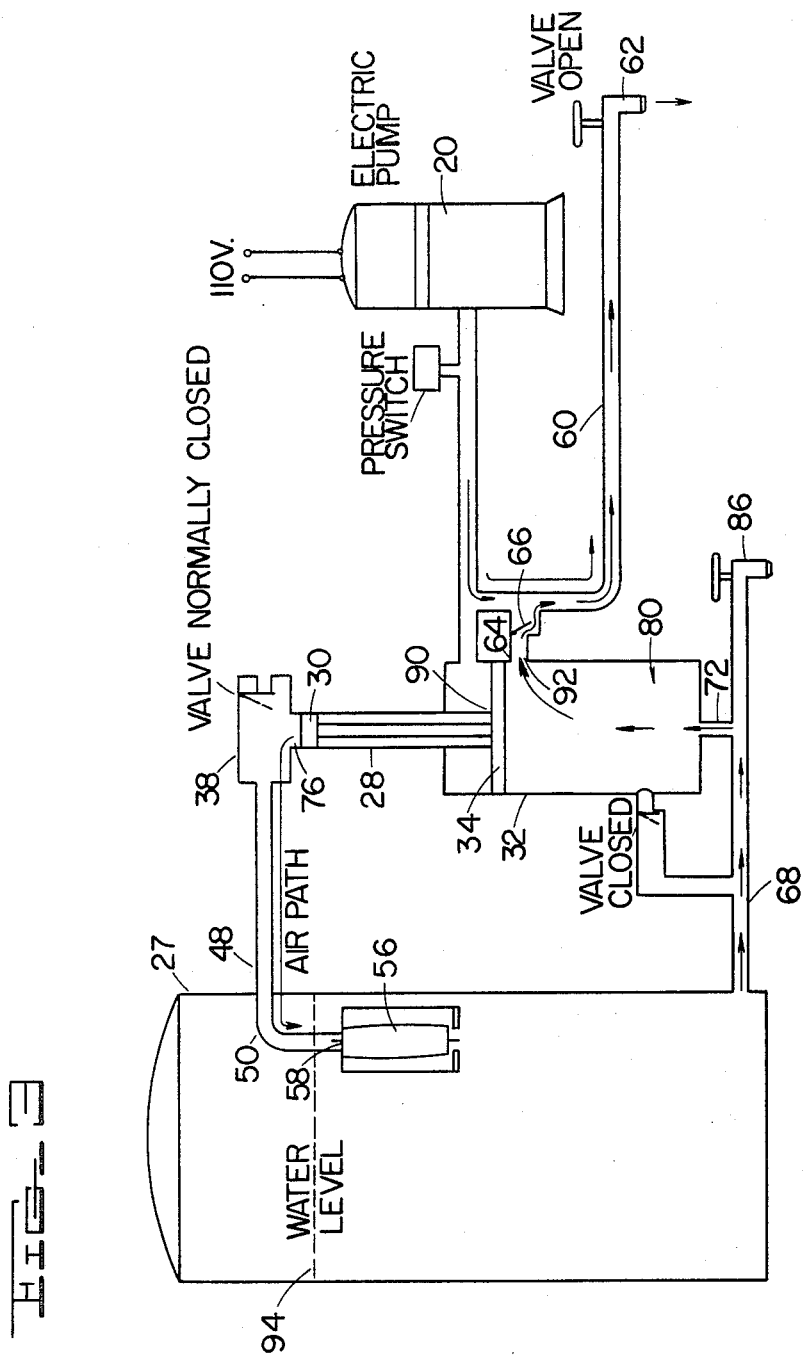

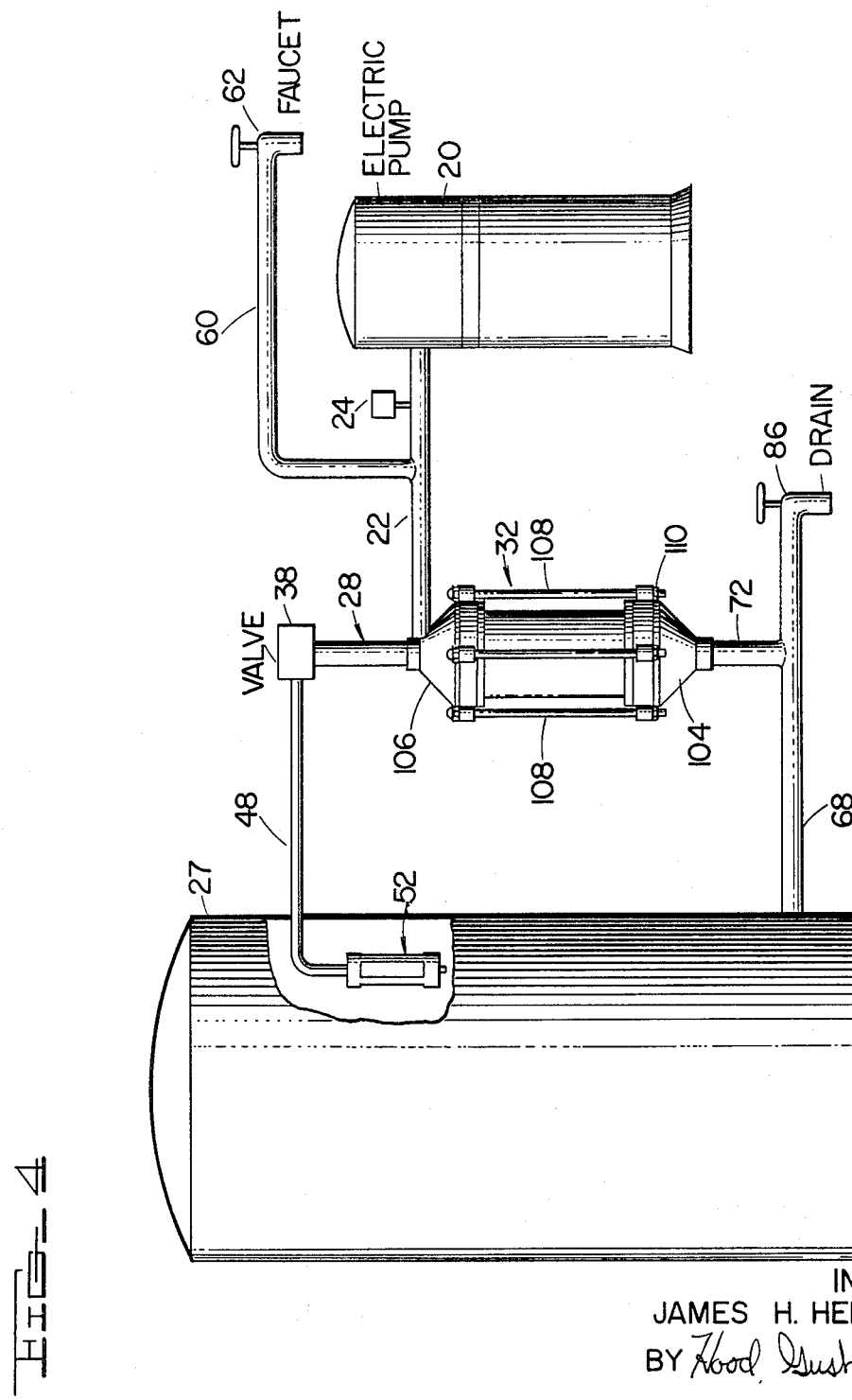

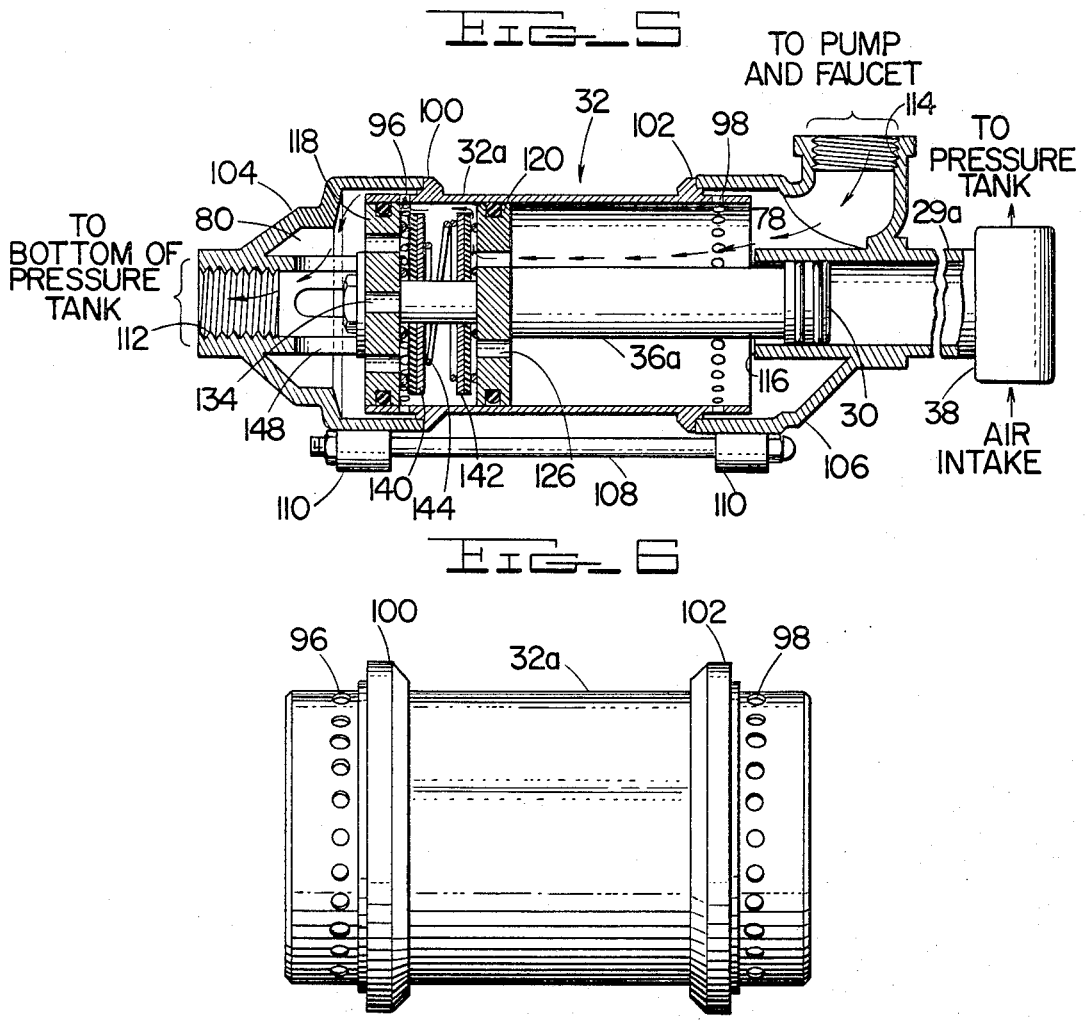

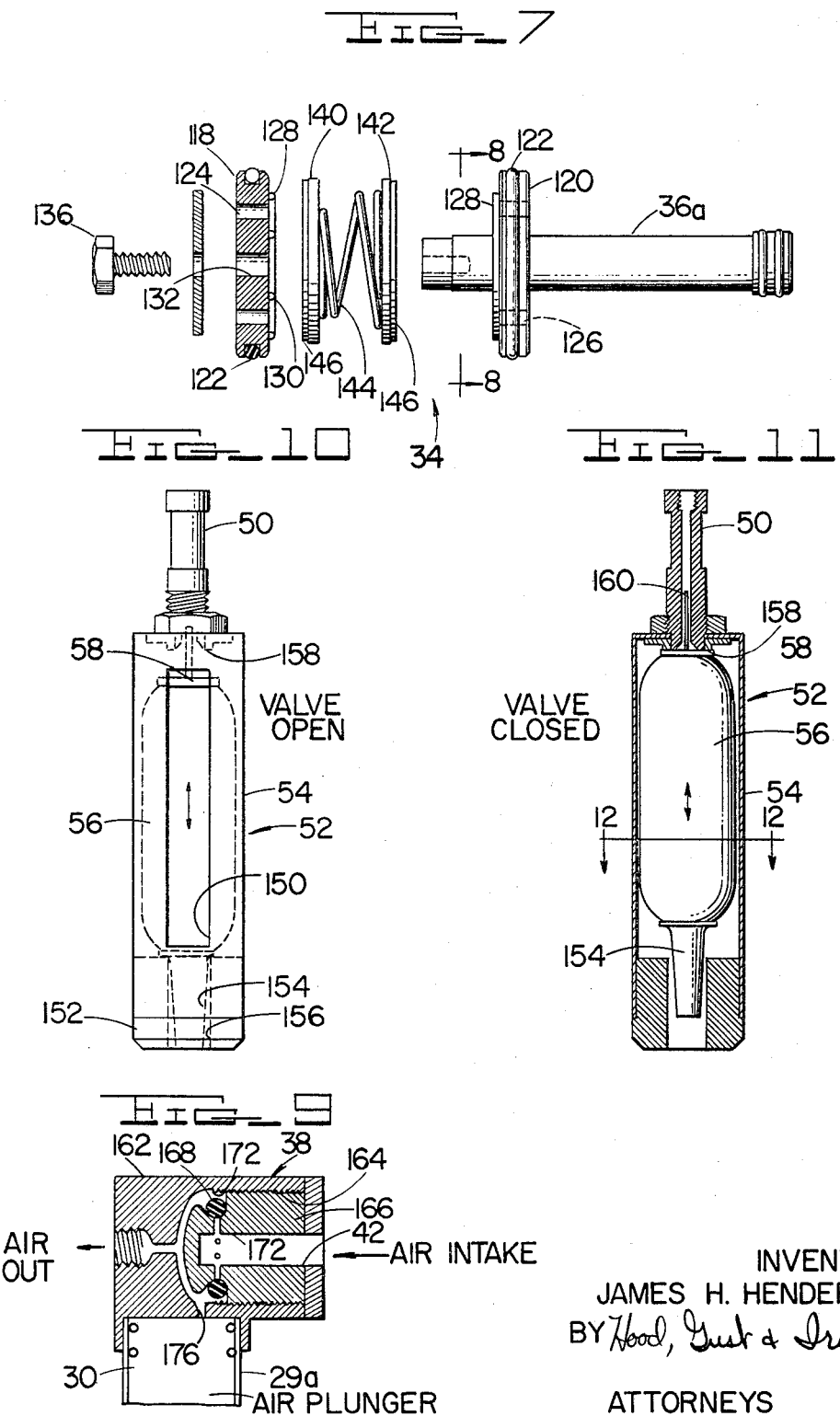

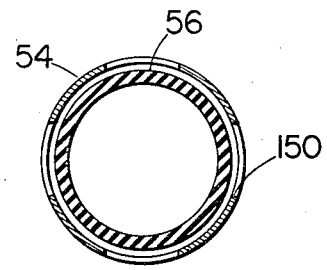
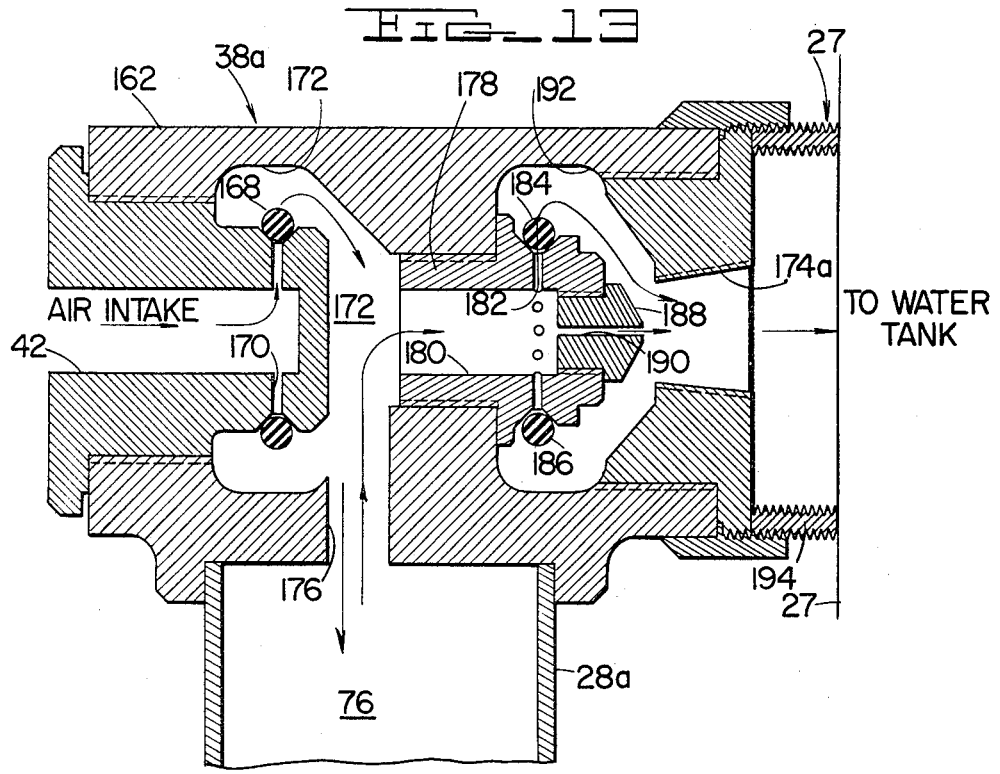

3,385,216
APPARATUS FOR REGULATING THE AIR
VOLUME IN A WATER SYSTEM
James H. Henderson, R.R. 2, Kewanna, Ind. 46939
Filed Oct. 22, 1965, Ser. No. 502,254
10 Claims. (Cl. 103—6)

ABSTRACT OF THE DISCLOSURE

An apparatus for regulating the volume of air in a water pressure tank of a water system. The system is connected to a pressure water tank having an air connection and a water connection. The system includes a first device having a variable volume chamber for receiving and exhausting air, a second device connected to the first device and selectively responsive to bi-directional flow of liquid for varying the size of the chamber, a one-way valve included in the first device for admitting air to the chamber from the atmosphere in response to an enlargement of the chamber and preventing the escape of air to atmosphere in response to a reduction in size of the chamber, the chamber having an exhaust port connected to the air connection of the tank, a flow-restricting device operatively connected to the exhaust port for cutting off flow of air in a direction from the tank toward the chamber when the level of water in the tank is at or above a first position and for permitting bi-directional flow between the chamber and the tank when the water level in the tank is at or below a second position which is spaced apart and below the first position, the second device having first and second variable volume compartments separated by a movable device, the movable device is movable between two extreme positions in response to differential fluid pressure, the first and second compartments having first and second ports operatively connected thereto, first and second valves are respectively connected to the first and second ports to allow flow of liquid only outwardly of the respective compartments, the first valve being open for exhausting liquid from said second compartment when the movable device is in one of the extreme positions and the second valve being open for exhausting fluid from said first compartment when the movable device is in the other of its extreme positions, the first port admits fluid into the first compartment and out of the the second valve when the movable device is in the other of its extreme positions, the second port is connected to the water connection of the tank and admits fluid into the second compartment and out of the first valve when the movable device is in said one position, a pump is connected to the first port, the chamber is enlarged when the movable device moves toward the other position in response to the urging of the pump, and the chamber is reduced when the device is moved in the opposite direction in response to the fluid pressure in the tank.

The present invention relates to an apparatus for regulating the volume of air in a water system, and more particularly to apparatus used in maintaining automatically the required volume of air in a water pressure tank.

In self-contained water systems, it is conventional for an electric pump to be used for pumping water into a pressure tank in which a head of air pressure is maintained for dispensing water from the tank. The air under pressure serves as a piston which acts against the water, thereby maintaining the water under pressure. In such water systems, it is not uncommon for the tank to waterlog, thereby causing the pump to cycle "on" and "off" at too frequent intervals during the dispensing of water from the tank.

It is an object of this invention to provide an air-regulating apparatus whereby the correct air volume in a pressure tank may be maintained over extended periods of time.

It is yet another object of this invention to provide an air-regulating system whereby air is automatically injected into a pressure tank at a proper time in order to prevent or correct water logging.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIGS. 1, 2 and 3 are diagrammatic illustrations of one embodiment of this invention;

FIG. 4 is an illustration of a practical embodiment of this invention;

FIG. 5 is a longitudinal sectional view of the control cylinders used in the arrangement of FIG. 4;

FIG. 6 is a side view of the cylinder portion of the assembly of FIG. 5;

FIG. 7 is an exploded view of the piston assembly used in the arrangement of FIG. 5;

FIG. 8 is a front view of one of the piston elements taken substantially along the section line 8—8 of FIG. 7;

FIG. 9 is a sectional view of the air-head assembly used in the arrangement of FIG. 5;

FIG. 10 is a side elevation of the float valve assembly shown ni FIGS. 1 through 4;

FIG. 11 is a longitudinal sectional view of the float assembly of FIG. 10;

FIG. 12 is a cross-section taken substantially along the section line 12—12 of FIG. 11; and FIG. 13 is a sectional illustration of a different airhead assembly than that shown in FIG. 9.

Referring to the drawings, and more particularly to FIGS. 1, 2 and 3, an ordinary water pump 20 has a main conduit 22 and a conventional pressure switch 24 connected thereto. The main conduit 22 is connected to an air-regulating assembly indicated generally by the reference numeral 26, this in turn being connected to a conventional pressure tank 27. The assembly 26 comprises essentially two piston-cylinder combinations connected in tandem, one cylinder 28 having a piston 30 reciprocable therein and a second cylinder 32 having a piston device 34 reciprocable therein. A piston rod 36 connects the two pistons 30 and 34 together, this cylinder-piston arrangement being coaxial as shown. The piston 30 is smaller in size than the piston 34 for reasons which will become apparent from the description that later follows. An air-head or air-regulating assembly 38 is mounted on the upper end 40 of the cylinder 28 and is provided with an air intake port 42 which is kept normally closed by means of a one-way check valve 44. The opposite end portion of this air-head 38 is provided with an exhaust port 46. A pipe 48 connects between the exhaust port 46 and the interior of the pressure tank 27.

Mounted on the end 50 of the air line 48 inside the tank 27 is a float valve assembly indicated generally by the reference numeral 52. Generally speaking, this float valve assembly 52 includes a housing or cage 54 which contains a buoyant element or float 56 having a valve member 58 on the upper end thereof. This valve member 58 is movable with the float 56 to control the opening and closing of the end of the line 50. This will be explained in more detail later on.

The main line 22 connects to the upper end of the cylinder 32 as shown. A branch conduit 60 leads from the main line 22 to a conventional, hand-operated faucet 62. Connected between this branch conduit 60 and the cylinder 32 is another branch line 64 having a normally closed, one-way check valve therein.

A pipe 68 is connected to the lower or bottom portion of the tank 28 as shown and has a first branch 70 leading to the lower end portion of the cylinder 32. Another branch 72 leads from this pipe 68 to the lower extremity of the cylinder 32 as shown. A normally closed, one-way check valve 74 is mounted in the branch line 70.

The piston 30 with the cylinder 28 provides a variable volume chamber 76 which reduces in size when the piston 30 moves upwardly from the position shown in FIG. 1 and enlarges in size when it is moved oppositely. The piston device 34 in the cylinder 32 divides the latter into two variable volume compartments, these being indicated by the numerals 78 and 80, respectively.

Now referring to FIGS. 1, 2 and 3, the operation of the system will be generally described. In FIG. 1, let it be first assumed that the water level in the tank 27 has dropped to the dashed line position indicated by the numeral 82. Let it also be assumed that the pressure switch 24 is next actuated to energize the electric pump 20 when the air pressure in the tank 27 drops to a level of 20-pounds. In this example, it is assumed that the level of the water 82 corresponds to a pressure drop to this level of 20-pounds and is sufficient to cause energization of the pump 20.

Water from the pump is delivered via the main line 22 to the upper end of the cylinder 32. This results in the piston 34 being driven downwardly to its extreme lower position at which the opening 84 to the branch conduit 70 is uncovered. Water thereupon flows through the compartment 78, unseats the valve 74 and flows onwardly into the tank 27 via the line 68. It is assumed that the valve 62 and a similar drain valve 86 are closed.

The float 56 is weighted such that it drops to the lower end of the cage 54, thereby separating the valve 58 from the open end of the air line 50. Therefore, as the piston 30 dropped, thereby enlarging the chamber 76, air was drawn from the upper end of the tank 27 through the line 48 and into the chamber 76. No air was drawn through the intake port 42, inasmuch as the valve 44 is normally closed under spring force.

As the water level rises in the tank 27 to a position indicated by the dashed line 88, let it be assumed that the volume of air in the tank 27 has been compressed sufficiently to reach a normal upper limit of pressure of about 40-pounds to 45-pounds. Normally, under this pressure condition, the pressure switch 24 turns the pump 20 "off." If this water level 88 is high enough, the float valve 56 will have raised sufficiently to seat the valve 58 over the open end of the air line 48. This will prevent further escape of air from the tank 27 back to the chamber 76. This completes the cycle of supplying water to the tank 27 under conditions at which the water is at maximum system pressure. Now referring to FIG. 3, when it is desired to withdraw water from the tank 27, the valve 62 is opened. This permits water to flow from the tank 27 through the drain line 68 and the branch 70 into the bottom compartment 80 of the cylinder 32. Inasmuch as the pressure in the compartment 78 is less than that in the compartment 80, the piston device 34 is driven upwardly until it stops or abuts against the bottom end 90 of the cylinder 28. When the piston 34 is in this latter position, the opening 92 between the cylinder 32 and the branch line 64 is uncovered, thereby permitting the flow of water through the latter which unseats the valve 66 normally closed by a spring force. The water thereupon continues its flow through the line 60 and out of the faucet 62.

As the cylinder 34 moved upwardly, it also moved the piston 30 upwardly. This resulted in forcing the air in the chamber 76 out of the air-head 38 through the line 48 and into the air tank 27. If the float valve 56, 58 is closed over the end of the conduit 50 at this time, the air in the chamber 76 is compressed to a high enough pressure to flow past the float valve 56, 58 and into the tank 27. Thus, each time the piston 30 is moved upwardly to the position shown in FIG. 3, air in the chamber 76 is forced into the tank 27.

Let it now be assumed that the water tank 27 is waterlogged, and that for this condition the water level is that indicated by the dashed line 94 in FIG. 3. Now referring to FIG. 2, if it is assumed that the water level 94 corresponds to a lower limit pressure of 20-pounds p.s.i. and the pump 20 is started in operation, the piston 34 will be driven downwardly from the position shown in FIG. 3 until the water level is raised to a sufficient height at which the upper pressure limit is reached and the pump 20 is turned "off." However, since the float valve 56, 58 is submerged in the water, it will be held upwardly in seated or closed position over the open end of the air line 50. Thus, when the piston 34 is moved downwardly to the position shown in FIG. 2 from the position shown in FIG. 3, the piston 30 also moved downwardly, thereby enlarging the chamber 76. Since this chamber 76 cannot draw air from the tank 27 because of the closed condition of the float valve 56, 58, the normally closed valve 44 is unseated, thereby drawing air from the atmosphere into the chamber 76. As soon as the piston 30 reaches its lower limit, the valve 44 closes under the spring force normally applied thereto. Thus, air is trapped in the chamber 76.

Now, when the valve 62 is opened, the piston 34 will be driven upwardly as previously explained, driving the air trapped in the chamber 76 into the tank 27 past the float valve 56, 58. Therefore, each time the pump 20 cycles between upper and lower pressure limits in the tank 27, a quantity of air will be injected into the tank 27 until the water level is depressed sufficiently so as not to cause flotation of the float valve 56, 58 when the water level is at the lower limit, such as 82 shown in FIG. 1. Under this latter condition, the float 56 will gravitate to the bottom end of the cage 54, thereby withdrawing the valve 58 from the end of the air line 50.

Now, so long as the water level in the tank 27 never rises high enough to close the float valve 56, 58 over the open end of the air line 50, reciprocation of the piston 30 will merely result in air circulating back and forth between the tank 27 and the chamber 76. Air will be drawn from the atmosphere into the chamber 76 only when the water level is high enough in the tank 27 to hold the float valve 56, 58 closed.

A practical, working embodiment of the invention as illustrated in FIGS. 1, 2 and 3 is shown in FIG. 4 and the succeeding figures. Like numerals will indicate like parts. The construction of the cylinder assemblies 28 and 32 is shown more clearly in FIGS. 5 through 8. The cylinder casing itself, identified by the numeral 32a, is shown more clearly in FIGS. 5 and 6. At the opposite ends of this cylinder there are provided a series of circumferentially arranged apertures 96 and 98 as well as two annular flanges 100 and 102. The opposite ends of this cylinder 32a are open as shown more clearly in FIG. 5.

Two end caps 104 and 106, respectively, are fitted over the opposite ends of the cylinder 32a as shown in FIG. 5, and are sealingly secured to the flanges 100 and 102. A circumferential series of tie rods 108 (also see FIG. 4) passing through lugs 110 cast integrally or otherwise secured to the end caps 104 and 106 draw the latter into firm, sealing engagement with the annular shoulders on the flanges 100 and 102. The end cap 104 is provided with a threaded bore 112 while the cap 106 is provided with an integral female coupling 114.

Coaxially extending outwardly from the end cap 106 and in coaxial alignment with the cylinder 32a is a smaller cylinder 28a which corresponds to the cylinder 28 in FIGS. 1 through 3. On the outer end of this cylinder 28a is the air-head 38 previously described.

The cylinder 28a extends inwardly of the cap 106 to a position at which the end 116 is even with the adjacent end of the cylinder 32a.

The piston device 34 as previously described in connection with FIGS. 1 through 3 is shown in FIGS. 5, 7 and 8 as including two piston elements 118 and 120 which are fixedly mounted in spaced-apart relationship as shown in FIG. 5 on a piston rod 36a. These piston elements 118, 120 are identically constructed, being disc-like elements having O-ring seals on the outer peripheries thereof. Also, these piston elements are provided with a series of circumferentially arranged, axially extending holes 124 and 126, respectively, these holes being arranged in patterns which are coaxial with respect to the axis of the cylinder 32a and the piston elements 118, 120. Each of the piston elements 118, 120 is further provided with raised, annular valve seats 128 and 130 concentrically arranged and coaxial with respect to the piston elements. As shown in FIGS. 5, 7 and 8, the circles of holes 124, 126 are coaxially positioned between the annular valve seats 128 and 130.

The piston element 120 is coaxially secured to the piston rod 36a as shown more clearly in FIG. 7. The piston element 118 has a central bore 132 which receives snugly the end 134 of the piston rod 36a which projects beyond the piston element 120. A screw 136 threads into the end 134 of the piston rod 36a, and clamps the piston element 118 against the radial shoulder 138 on the piston rod. By this means, the piston elements 118 and 120 are rigidly secured in spaced-apart, parallel relation to the piston rod 36a.

Mounted between the two piston elements 118, 120 is a valve assembly which includes two annular poppet valves 140 and 142 which are coaxially secured to the opposite ends, respectively, of a helical compression spring 144. Each of the poppet valves 140 and 142 is faced with an annular rubber element 46 which is intimately, sealingly engageable with the respective valve seats 128 and 130.

The poppet valve 140 is adapted to engage the seats 128 and 130, thereby sealing off the circle of apertures 124 in the piston element 118. Likewise, the poppet valve 142 is engageable with the valve seats 128 and 130 of the element 120 for sealing off the holes 126. The compression spring 144 normally maintains the poppet valves 140 and 142 into sealing engagement with the valve seats 128 and 130 respectively.

As shown more clearly in FIG. 5, the end cap 104 has an inwardly projecting abutment 48 which is actually a coaxial extension of the threaded portion 112. This abutment 148 is engageable by the piston element 118 as shown for limiting the leftward movement thereof as shown in FIG. 5. Rightward movement of the piston device 34 is limited by engagement of the piston element 120 with the end 116 of the cylinder 28a.

When the piston device 34 is in its leftward position as shown in FIG. 5, the two piston elements 118 and 120 straddle the circle of apertures 96 in the cylinder 32a. Similarly, with the piston in its extreme rightward position, these piston elements straddle the circle of apertures 98. The reason for this relationship will be explained in more detail later on.

Referring to FIG. 5, on the right-hand end of the piston rod 36a is provided the piston 30 as explained earlier. This piston 30 is adapted to reciprocate in the cylinder 28a.

The assembly of FIGS. 5 through 8 is connected into the water system as shown in more detail in FIG. 4. Keeping in mind the explanations already given in connection with FIGS. 1, 2 and 3, operation of the cylinder assembly of FIGS. 5 through 8 will now be explained. Referring more specifically to FIGS. 4 and 5 and first assuming that all of the parts are in the position shown in FIG. 5, if the faucet 62 of FIG. 4 is opened, a difference of pressure will be developed over the piston device 118, 120, tending to drive it toward the right as viewed in FIG. 5. This occurs by reason of water at higher pressure being in the line 72 (FIG. 4) which acts against the piston element 120 after passing through the apertures 96. This differential of pressure seals the poppet valve 142 over the valve seats 128 and 130 of the piston element 120. The piston device is therefore driven to the right until the piston element 120 engages the end 116 of the cylinder 28a. The water under pressure in the chamber 80 now passes through the holes 124 in the piston element 118, unseats the poppet 140 against the force of the spring 144 and flows radially outwardly through the apertures 98 into the compartment 78 in the end cap 106. The water continues its flow outwardly of the coupling 114 through the line 22 and the branch 60 and out of the faucet 62.

Now assuming that the piston device 118, 120 is in this extreme rightward position and the faucet 62 is turned "off" and the pump 20 is operated, water under pressure will be driven through the main line 22 into the compartment 78. This water will act against the piston device 118, 120, passing through the holes 98 and bearing directly against the piston element 118. In this event, because of the differential pressure over the piston element 118, the poppet valve 140 will be maintained closed against the valve seats 128 and 130. This differential of pressure over the piston element 118 is due to the fact that the pressure in the tank 27 is at a lower level at this particular time than is that in the line 22 as produced by the pump 20.

The piston device 118, 120 is thereupon forced to the left until the abutment 148 is engaged. At this time, the water flows through the apertures 126 in the piston element 120, unseats the poppet 142 and flows out of the apertures 96 and into the compartment 80 in the end cap 104. From this compartment 80, the water flows out of the coupling 112, into the lines 72 and 68, and finally into the pressure tank 27.

The float valve construction is more clearly shown in FIGS. 10 and 11. As previously described, this valve includes a metal cage 54 having a series of circumferentially arranged, axially extending slots 150 therein. Suitably heavy metal weights 152 are secured to the bottom end of the cage 54 to make certain that the cage and its remaining assembly will not float when submerged in the water.

Movably contained within the cage 54 is the buoyant float 56 which is elongated and provided at its lower end with a projection 154 which loosely fits through an aperture 156 in the base 152 of the cage. On the upper end of the float is provided the valve 58, previously described, this valve sealing against an annular seat 158 coaxially secured to the end of the air line 50. The float 56 when moved upwardly so as to engage the valve 58 with the seat 158 closes off the opening in the end of the line 50. This closed condition is illustrated in FIG. 11.

When the cage 54 is submerged in water, the float 56 is sufficiently buoyant to rise until the valve 58 seals against the valve seat 158. When not submerged, the float 56 drops by reason of the weighted projection 154 thereon, thereby opening the end of the line 50. A suitable guide pin 160 coaxially projects above the float 56 and enters the line 50 for guiding the float 56 in its reciprocatory movement inside the cage 54. The operation of this float assembly was described in detail in connection with FIGS. 1, 2 and 3.

One embodiment of the air-head 38 is shown in detail in FIG. 9. This air-head comprises a housing or body 162 having a threaded opening 164 into which is fitted a plug 166. This plug is provided with an elongated cylindrical bore 42 which serves as the air intake.

The inner end of the plug 166 is provided with an annular groove 168 which coaxially surrounds the bore 42. A series of radially extending passages 170 connect the bore 42 with the bottom of the groove 168. An O-ring of rubber or the like snugly fits into the groove 168 and seals off the passages 170.

A clearance is provided between the housing 162 and the plug 166, thereby providing a cavity 172 as shown. To this cavity is connected an exhaust port 174 which in the embodiment of FIGS. 1 through 4 is connected directly to the air line 48.

Also connected to the cavity 172 is a passage 176 which connects directly with the chamber 76 in the air cylinder 28, 28a.

When the plunger or piston 30 is moved downwardly as viewed in FIG. 9, the chamber 76 (FIGS. 1 through 4) enlarges. If it is assumed that the exhaust port 174 is closed by the float valve 56, 58 in the water tank 27, air will be drawn through the air intake 42, passages 170 and will unseat the O-ring 168. This air will fill the cavity 172 as well as the chamber 76 which enlarges as the piston 30 lowers (FIG. 9).

When movement of the piston 30 stops, the O-ring 168 snugly fits over and closes the passages 170, thereby preventing the escape of any air from the chamber 76 (FIGS. 1 to 4).

Now, when the piston 30 is raised, air in the chamber 76 will be compressed and will be forced out of the exhaust port 174 inasmuch as the O-ring 168 acts as a one-way check valve and closes off the passages 170.

An alternative construction for the air-head 38 is indicated in FIG. 13 and is identified by the symbol 38a. In the use of this embodiment, the float valve 56, 58 is preferably omitted. The air-head 38a is therefore connected directly to the pressure tank 27 as will now be explained. This air-head 38a in certain respects is constructed essentially the same as the air-head 38 of FIG. 9. Like numerals will therefore indicate like parts. An additional plug or core, however, identified by the numeral 178, is sealingly secured by means of a threaded connection into the housing 162 and has a bore 180 opening into the cavity 172. This bore 180 is also provided with a series of passages 182 which lead to an annular groove 184 coaxial with the bore 180. An O-ring 186 fits into this groove 184 the same as previously explained in connection with the O-ring 168.

Another plug 188 is coaxially fitted into the end of the bore 180 and is provided with a tiny passage or restriction 190 which opens through the exhaust port 174a of the air-head 38a. A second cavity 192 formed in the housing 38a surrounds the O-ring 186, this cavity 192 opening into the exhaust port 174a.

The right-hand end of the housing 38a is connected directly to the pressure tank 27 by means of a suitable coupling 194. This coupling 194 is located near the top portion of the water tank 27 at a location which would be below the level of the water in the tank when it is water-logged.

Referring to this FIG. 13, when the piston 30 (not shown) lowers in the cylinder 28a to enlarge the chamber 76, air is drawn through the intake 42 and into the cavity 172. When the piston rises so as to reduce the volume of the chamber 76, this trapped air is forced through the bore 180, through the passages 184, past the O-ring 186, into the cavity 192, the exhaust port 174a, and into the pressure tank. Also, the air passes through the restriction 190 into the air tank.

If the tank 27 water-logs, the level of the water will rise above the restriction 190. When this happens, and the piston 30 (not shown) lowers so as to enlarge the chamber 76, the water momentarily clogs the restriction 190, thereby creating a pressure differential in the cavity 172 which permits air to flow through the air intake 42 past the O-ring 168 and into the chamber 76. Thus, the restriction 190 must be small enough so as to inhibit the flow of water during this intake of air.

On the next upward cycle of the piston 30, the air and water trapped in the cavity 172 is forced outwardly past the O-ring 186 and into the water tank 27, as previously explained. Each time the pump cycles "on" and "off," a charge of air will be forced into the tank 27.

When the tank 27 is not water-logged, enlargement of the chamber 76 by retractile movement of the piston 30 will result in the air in the tank flowing through the passage 190 and into the cavity 172. No air will flow through the air intake 42, because the restriction 190 is made large enough so as to permit a fast enough flow of air into the cavity 172 to keep the pressure differential over the O-ring 168 sufficiently high to maintain the passages 170 closed. Thus, until the tank 27 becomes water-logged, no air will be taken into the system through the air intake 42.

In the following are given some typical dimensions for an operating embodiment of this invention, these dimensions being given by way of example only. Obviously, these dimensions may be varied without departing from the spirit and scope of this invention.

| | |
|---|---|
| Piston 30 inches | 1¼ |
| Piston 34, 118, 120 do | 3 |
| Length of piston rod between piston element 120 and piston 30 do | 4 |
| Spacing between piston elements 118, 120 do | ¾ |
| Thickness of pistons 118, 120 do | ½ |
| Size of apertures 124, 126 do | 5/16 |
| Number of apertures 124 in each piston element | 8 |
| Typical upper and lower limits of pressure in the pump system | (1) |

[1] 40 p.s.i. and 20 p.s.i., respectively.

While there have been described above the principles of this invention in connection with specific apparatus, it is to be clearly understood that this description is made only by way of example and not as a limitation to the scope of the invention.

What is claimed is:

1. Apparatus for regulating the air pressure in a water system comprising first means providing a variable volume chamber for receiving and exhausting air, second means connected to said first means and selectively responsive to bi-directional flow of liquid for varying the size of said chamber, one-way valve means included within said first means for admitting air to said chamber from the atmosphere in response to enlargement of said chamber and for preventing the escape of air to atmosphere in response to the reduction in size of said chamber, said chamber having an exhaust port, said second means including first and second variable volume compartments separated by a device movable in opposite directions between two extreme positions in response to differential fluid pressure thereover, first and second port means connected to said first and second compartments, respectively, first and second valve means connected to said first and second port means respectively for permitting only unidirectional flow of fluid through the latter in directions outwardly of said first and second compartments only, said first valve means being open for exhausting fluid from said second compartment when said movable device is in one of its extreme positions, said second valve means being open for exhausting fluid from said first compartment when said movable device is in the other of its extreme positions, said first port means including means for admitting fluid to said first compartment whereby such fluid flows therethrough and past said second valve means when said movable device is in said other position, said second port means including means for admitting fluid to said second compartment whereby such fluid flows therethrough and past said first valve means when said movable device is in said one position, said chamber being enlarged when said movable device moves toward said other position and being reduced when said device moves in the opposite direction.

2. The apparatus of claim 1 including a pressure water tank having an air connection and a water connection, said air connection being connected to the exhaust port of said chamber, said water connection being connected to said second port means.

3. The apparatus of claim 1 including a pressure water tank having an air connection and a water connection, said air connection being connected to the exhaust port of said chamber, said water connection being connected to said second port means, a pump connected to said first port means, and outlet conduit means also connected to said first port means.

4. The apparatus of claim 1 wherein said first means includes a first cylinder and a first piston reciprocable therein, said movable device of said second means includes a second cylinder and a second piston reciprocable therein, a piston rod connecting both pistons together for simultaneous movement, whereby movement of said second piston from said one position to said other position results in moving said first piston and enlarging said chamber.

5. The apparatus of claim 1 including a pressure water tank having an air connection and a water connection, said air connection being connected to the exhaust port of said chamber, said water connection being connected to said second port means, and a float valve in said water tank connected to said air connection, said float valve including one-way valve means for cutting off flow of air in a direction from said tank toward said chamber when said float valve is at least partially submerged in water but for permitting bi-directional flow when not submerged in water.

6. The apparatus of claim 1 wherein said first means includes a first cylinder and a first piston reciprocable therein, said movable device of said second means includes a second cylinder and a second piston reciprocable therein, a piston rod connecting both pistons together for simultaneous movement, whereby movement of said second piston from said one position to said other position results in moving said first piston and enlarging said chamber, said first cylinder having opposite ends, in air-regulating device mounted on one of said ends; said air-regulating device including a member having an annular groove therein and an open ended bore which communicates with the atmosphere, at least one passage in said member extending between said annular groove and said bore, an O-ring valve of rubber-like material snugly concentrically fitted into said groove and normally closing off said passage, said housing having a first cavity therein communicating operatively with said groove, said exhaust port of said chamber communicating with said cavity, said one-way valve means including said O-ring, said chamber communicating with said cavity whereby movement of said first piston in a direction to enlarge said chamber results in drawing air through said passage past said O-ring when said exhaust port is closed.

7. The apparatus of claim 2 including means for cutting off the flow of air in a direction from said tank toward said chamber when the level of water in said tank is at a first position and for permitting bi-directional flow between said tank and said chamber when the water level in said tank is in a second position, said first position being higher than said second position.

8. Apparatus for regulating the air pressure in a water system comprising first means providing a variable volume chamber for receiving and exhausting air, second means connected to said first means and selectively responsive to bi-directional flow of liquid for varying the size of said chamber, one-way valve means included within said first means for admitting air to said chamber from the atmosphere in response to enlargement of said chamber and for preventing the escape of air to atmosphere in response to the reduction in size of said chamber, said chamber having an exhaust port, said second means including first and second variable volume compartments separated by a device movable in opposite directions between two extreme positions in response to differential fluid pressure thereover, first and second port means connected to said first and second compartments, respectively, first and second valve means connected to said first and second port means respectively for permitting only unidirectional flow of fluid through the latter in directions outwardly of said first and second compartments only, said first valve means being open for exhausting fluid from said second compartment when said movable device is in one of its extreme positions, said second valve means being open for exhausting fluid from said first compartment when said movable device is in the other of its extreme positions, said first port means including means for admitting fluid to said first compartment whereby such fluid flows therethrough and past said second valve means when said movable device is in said other position, said second port means including means for admitting fluid to said second compartment whereby such fluid flows therethrough and past said first valve means when said movable device is in said one position, said chamber being enlarged when said movable device moves toward said other position and being reduced when said device moves in the opposite direction, said first means includes a first cylinder and a first piston reciprocable therein, said movable device of said second means includes a second cylinder and a second piston reciprocable therein, a piston rod connecting both pistons together for simultaneous movement whereby movement of said second piston from said one position to said other position results in moving said first piston and enlarging said chamber, said first cylinder having opposite ends, an air-regulating device mounted on one of said ends; said air-regulating device including a member having an annular groove therein and an open ended bore which communicates with the atmosphere, at least one passage in said member extending between said annular groove and said bore, an O-ring valve of rubber-like material snugly concentrically fitted into said groove and normally closing off said passage, said housing having a first cavity therein communicating operatively with said groove, a second member in said housing surrounded by a second cavity, said second member having a second annular groove therein which receives a second O-ring valve of rubber-like material, said second groove being in communication with a second cavity, a second passage connecting said first cavity with said second groove, said second passage being normally closed by said second O-ring valve, said exhaust port of said chamber communicating with said second cavity, a restricted passage in said second member connecting said first cavity with said exhaust port thereby providing restricted communication between said exhaust port and said second cavity, said one-way valve means including the first-mentioned O-ring valve, said chamber communicating with said second cavity.

9. Apparatus for regulating the air pressure in a water system comprising first means providing a variable volume chamber for receiving and exhausting air, second means connected to said first means and selectively responsive to bi-directional flow of liquid for varying the size of said chamber, one-way valve means included within said first means for admitting air to said chamber from the atmosphere in response to enlargement of said chamber and for preventing the escape of air to atmosphere in response to the reduction in size of said chamber, said chamber having an exhaust port, said second means including first and second variable volume compartments separated by a device movable in opposite directions between two extreme positions in response to differential fluid pressure thereover, first and second port means connected to said first and second compartments, respectively, first and second valve means connected to said first and second port means respectively for permitting only unidirectional flow of fluid through the latter in directions outwardly of said first and second compartments only, said first valve means being open for exhausting fluid from said second compartment when said movable device is in one of its extreme positions, said second valve means being open for exhausting fluid from said first compartment when said movable device is in the other of its extreme positions, said first port means including means for admitting fluid to said first compartment whereby such fluid flows therethrough and past said second valve means when said movable device is in said other position, said second port means including means for admitting fluid to said second compartment whereby such fluid flows therethrough and past said first valve means when said movable device is in said one position, said chamber being enlarged when said movable device moves toward said other position and being reduced when said device moves in the opposite direction, said first means includes a first cylinder and a first piston reciprocable therein, said movable device of said second means includes a second cylinder and a second piston reciprocable therein, a piston rod connecting both pistons together for simultaneous movement, whereby movement of said second piston from said one position to said other position results in moving said first piston and enlarging said chamber; said second piston comprising two piston elements axially spaced apart and rigidly connected together, said pistons having a plurality of apertures therethrough, two poppet valves interposed between and engageable with said piston elements, respectively, in closing relation with said apertures, spring means urging said poppet valves into engagement with said piston elements, respectively, said second cylinder having at least one hole in each end thereof, each hole being straddled by said piston elements when the latter are moved to said extreme positions, said first and second valve means including the aforesaid poppet valves and the piston elements, respectively.

10. Apparatus for regulating the air pressure in a water system comprising first means providing a variable volume chamber for receiving and exhausting air, second means connected to said first means and selectively responsive to bi-directional flow of liquid for varying the size of said chamber, one-way valve means included within said first means for admitting air to said chamber from the atmosphere in response to enlargement of said chamber and for preventing the escape of air to atmosphere in response to the reduction in size of said chamber, said chamber having an exhaust port, said second means including first and second variable volume compartments separated by a device movable in opposite directions between two extreme positions in response to differential fluid pressure thereover, first and second port means connected to said first and second compartments, respectively, first and second valve means connected to said first and second port means respectively for permitting only unidirectional flow of fluid through the latter in directions outwardly of said first and second compartments only, said first valve means being open for exhausting fluid from said second compartment when said movable device is in one of its extreme positions, said second valve means being open for exhausting fluid from said first compartment when said movable device is in the other of its extreme positions, said first port means including means for admitting fluid to said first compartment whereby such fluid flows therethrough and past said second valve means when said movable device is in said other position, said second port means including means for admitting fluid to said second compartment whereby such fluid flows therethrough and past said first valve means when said movable device is in said one position, said chamber being enlarged when said movable device moves toward said other position and being reduced when said device moves in the opposite direction, said first means includes a first cylinder and a first piston reciprocable therein, said movable device of said second means includes a second cylinder and a second piston reciprocable therein, a piston rod connecting both pistons together for simultaneous movement, whereby movement of said second piston from said one position to said other position results in moving said first piston and enlarging said chamber; said second piston comprising two piston elements axially spaced apart and rigidly connected together, said pistons having a plurality of apertures therethrough, two poppet valves interposed between and engageable with said piston elements, respectively, in closing relation with said apertures, spring means urging said poppet valves into engagement with said piston elements, respectively, said second cylinder having at least one hole in each end thereof, each hole being straddled by said piston elements when the latter are moved to said extreme positions, said first and second valve means including the aforesaid poppet valves and the piston elements, respectively, the opposite ends of said second cylinder being open, two end caps mounted on the opposite end portions of said second cylinder, respectively, and covering said holes, said end caps providing passageways communicating with said holes, said end caps having ports, respectively for connection to a plumbing system.

References Cited

UNITED STATES PATENTS

| | | | |
|---|---|---|---|
| 1,661,886 | 3/1928 | Eisenhauer | 103—118 |
| 1,941,766 | 1/1934 | Thom | 103—6 |
| 2,183,421 | 12/1939 | Brady | 103—209 X |
| 2,704,632 | 3/1955 | Pedroia | 230—52 |
| 2,822,121 | 2/1958 | Sadler et al. | 103—6 X |
| 2,916,042 | 12/1959 | Brady | 103—6 |
| 3,053,435 | 9/1962 | Sanders et al. | 230—52 |
| 3,133,501 | 5/1964 | Brady | 103—6 |
| 3,259,067 | 7/1966 | Bryan | 103—6 |

FOREIGN PATENTS 460,038  10/1949  Canada.

DONLEY J. STOCKING, *Primary Examiner.*

WILLIAM L. FREEH, *Examiner.*